April 9, 1963 H. J. KLOTZ ETAL 3,084,856

MAGNETIC CORE SEQUENCE CHECKING APPARATUS

Filed Dec. 17, 1958

3 Sheets-Sheet 1

INVENTORS.
HERMAN J. KLOTZ
FREDERICK J. DROEGE
GENADIJ KRYSIUK

BY Francis V. Giolma
ATTORNEY

MAGNETIC CORE SEQUENCE CHECKING APPARATUS

Filed Dec. 17, 1958

3 Sheets-Sheet 2

April 9, 1963 H. J. KLOTZ ETAL 3,084,856

MAGNETIC CORE SEQUENCE CHECKING APPARATUS

Filed Dec. 17, 1958 3 Sheets-Sheet 3

United States Patent Office 3,084,856 Patented Apr. 9, 1963

3,084,856

MAGNETIC CORE SEQUENCE CHECKING APPARATUS

Herman J. Klotz, Endicott, and Frederick J. Droege and Genadij Krysiuk, Vestal, N.Y., assignors to International Business Machines Corporation, New York, N.Y., a corporation of New York Filed Dec. 17, 1958, Ser. No. 781,004
8 Claims. (Cl. 235—61.7)

Figure 1:
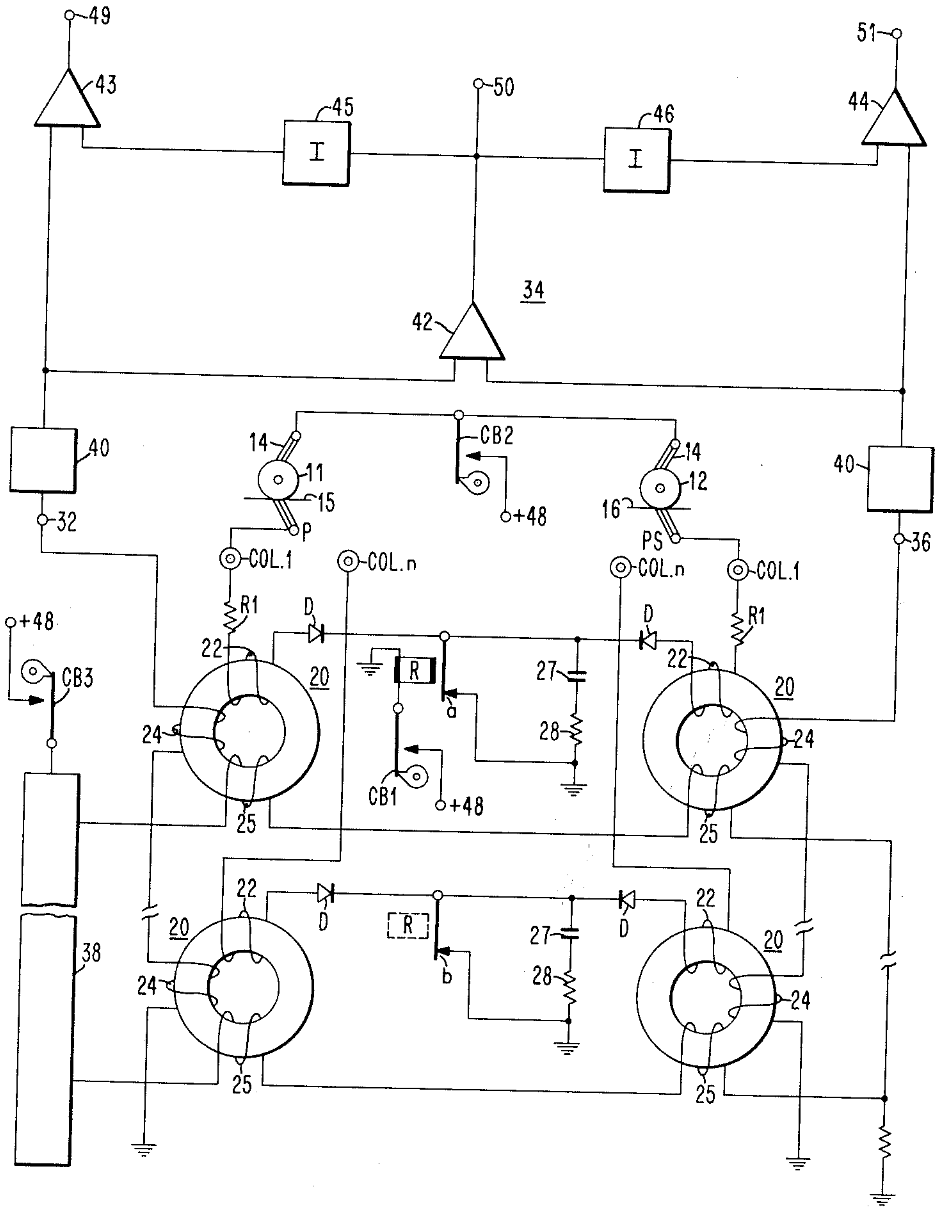

This invention relates generally to comparing means, and it has reference in particular to magnetic core storage sequence checking apparatus for punched card record controlled machines.

Generally stated, it is an object of the invention to provide for using magnetic core storage means to determine which of two pulses occurred before the other.

More specifically, it is an object of this invention to provide for using magnetic core devices to determine which of two record cards has the higher order data thereon.

It is also an object of this invention to provide for using magnetic core storage devices to sequence check digits representing data on a pair of data bearing elements.

Yet another object of this invention is to provide for using magnetic core storage means for selectively storing only data of high or low order from corresponding columns of two record cards having record card data thereon, and subsequently reading out the stored data column by column.

A further object of the invention is to provide a simple and effective magnetic core sequence checking system for determining the sequence of data bearing cards in a collator or other record controlled machine.

A yet further object of the invention is to provide for simultaneously scanning one or more columns of each of a pair of record cards having data recorded thereon, digit by digit in each column, and selectively storing data from the corresponding columns of only one card or the other of the pair when corresponding columns have unequal digits.

An important object of the invention is to provide for using nondestructive readout magnetic core storage devices in a sequence checking system for record card controlled machines, and for using energy storing means in circuit with the write windings of the core devices for recording data in corresponding columns so as to prevent recording in one core device a digit read in the column of one card at a later digit time than a digit read in a corresponding column of the other card at an earlier digit time.

Another important object of the invention is to provide for using magnetic core storage devices in a sequence checking system for a record card controlled machine such as a collator and for selectively utilizing only the data read at a later digit time for determining the sequence of the data on the cards.

In accordance with a preferred embodiment of this invention, each of the primary and primary sequence brush stations of a record card controlled machine, such as a collator, has associated therewith a magnetic core storage device for each column of data to be read from a card. These core storage devices each have a write winding, a sense winding and a sample and/or reset winding. The write windings are connected at one end to their respective brushes and at the other end to ground through a common capacitor which will permit a current pulse of sufficient size to set only one core or the other when their respective brushes make a circuit through a hole in sequence, and yet sufficient to set both cores when their brushes read holes at the same time and they are pulsed simultaneously. The sense windings of the core devices for all columns of the primary brush station are connected in series, as are those of the primary sequence brush station, and thence to a logic comparison circuit for applying pulse signals thereto. The sample windings for each column of the two stations are connected in series and are pulsed by a timing ring, column by column in sequence during readout time, high order first, so as to determine the sequence of data in the cards at the primary and primary sequence stations, respectively, and reset the cores.

Other objects of the invention will be pointed out in the following description and claims and illustrated in the accompanying drawings, which disclose, by way of examples, the principle of the invention and the best mode, which has been contemplated, of applying that principle.

Figure 2:
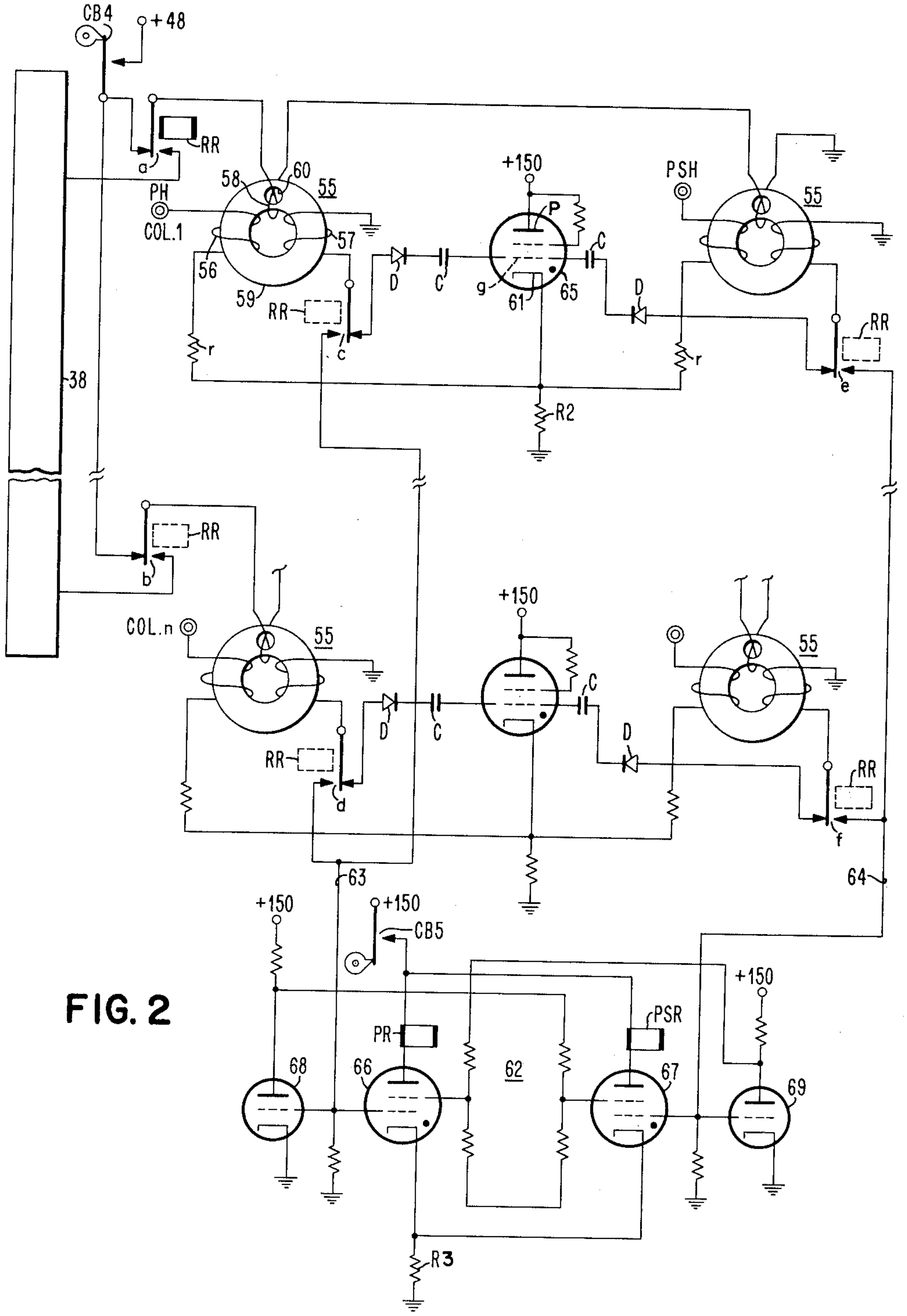
Figure 3:
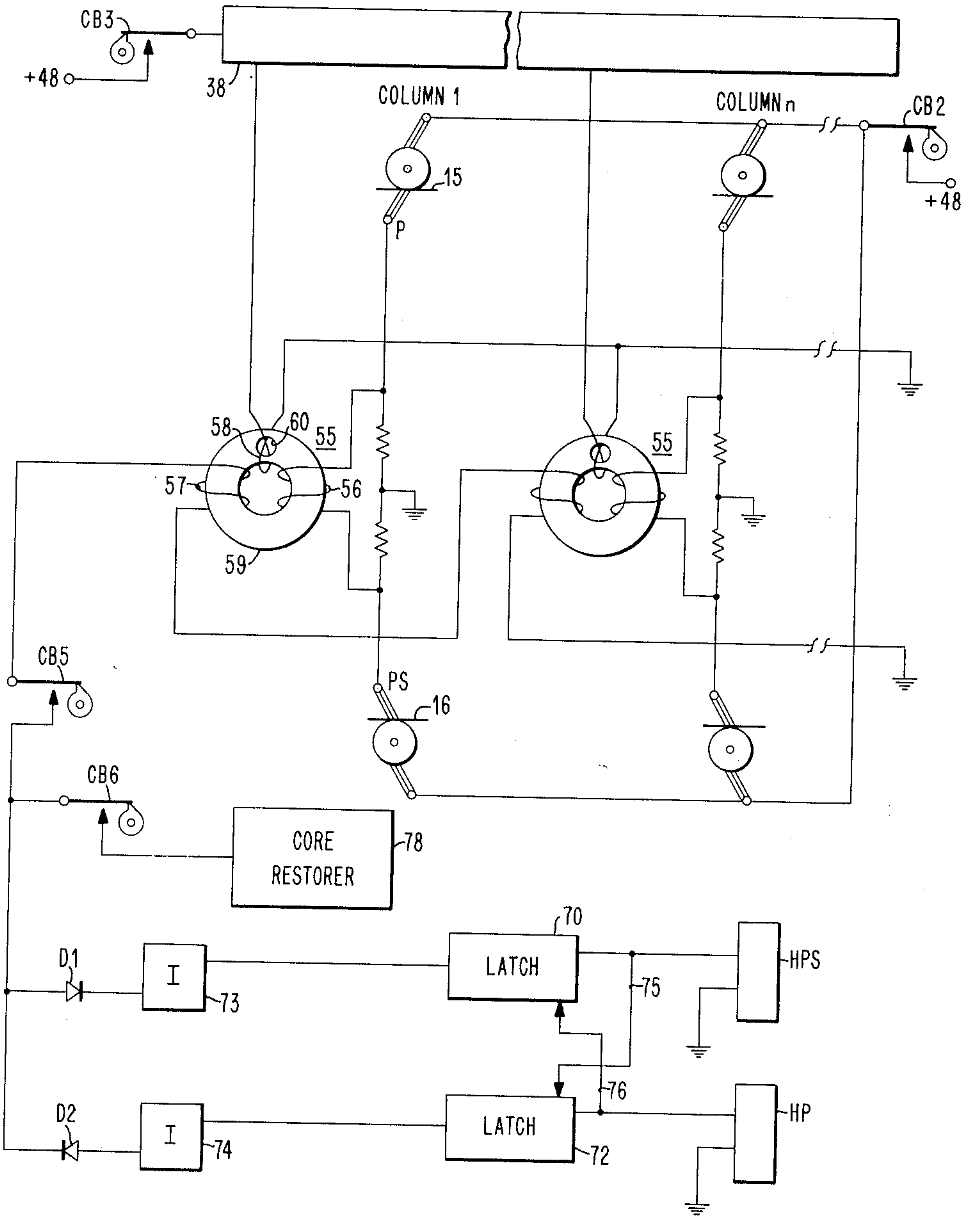

In the drawings:

FIG. 1 is a schematic diagram of a magnetic core storage sequence checking circuit embodying the invention in one of its forms, FIG. 2 is a schematic diagram of a magnetic core storage sequence checking circuit embodying the invention in another of its forms, and FIG. 3 is a schematic diagram of yet another magnetic core storage sequence checking circuit embodying the invention in yet a different form.

In each of the drawings of the various sequence checking circuits, many of the individual components or units making up that device are indicated merely as a box or block. The specific circuitry of such blocks will not be generally described as applied to various typical forms of tubes and/or diode circuits. A detailed description of the necessary typical diode coincident switches, diode mixers, inverters, single and double latches, along with cathode followers and power tubes wherever required, and which would be applicable or necessary to apparatus of this type is shown and described in the application of F. E. Hamilton et al., Serial No. 544,520, filed November 2, 1955, now Patent No. 2,959,351 issued Nov. 8, 1960, and assigned to the assignee of the present invention.

For the purposes of this description, a typical coincidence switch, shown as a triangle and otherwise known as a logical AND circuit or diode switch, comprises diodes or the like, not shown, each including an individual input terminal normally biased negative, so that the common terminal is at negative potential with respect to ground. If coincident positive pulses are applied to all input terminals, the potential of the output terminal is raised. However, if only one of the input terminals is pulsed positively, the potential of the common output terminal is not raised appreciably. Any voltage responsive device may be controlled by the potential of the output terminal to furnish a usable output voltage level whenever a coincidence of positive input pulses is effected.

While cathode followers, inverters, or the like, are not shown in detail, it is to be understood that various types may be utilized in different locations, and the circuits may involve various resistance values and capacity couplings to produce the desired outputs. Since the particular cathode followers and inverters, etc., used are not part of the present invention, a detailed description of each type is not deemed necessary. Likewise, in the drawings, all power tubes, inverters, double inverters, pulse shapers and the like which normally would be required to maintain the proper signal level or provide the proper shape of pulse have, for the purpose of simplicity, been either shown in block form or eliminated. The type and number and particular location would depend only on the results desired, and is within the skill of one normally skilled in the art. Also for the sake of simplicity, details of the necessary driving rings, single and double latches, have been eliminated.

Referring generally to FIG. 1, there are shown a pair of brushes P and PS operating in conjunction with contact rolls 11 and 12, for sensing data represented by punched holes in cards 15 and 16 which may be advanced successively past the rolls 12 and 11 by suitable feed means of a type well known in the art. These brushes and contact rolls are connected to a suitable direct current source through contact brushes 14 and a card digit pulse circuit breaker CB2 and may be of the type used in the record controlled machines of the copending application Serial No. 631,855 of H. J. Klotz, filed December 31, 1956, now Patent No. 2,995,241, issued August 8, 1961, and assigned to the assignee of the present invention, of Patent No. 2,359,670, which issued on October 3, 1944, to R. E. Page or such as shown in the Patent No. 2,434,512, which issued on January 13, 1948, to R. E. Page et al. As shown, the cards 15 and 16 are being fed from right to left in the primary feed, and successively past the primary sequence and primary brushes PS and P, respectively.

In order to provide for checking the sequence of data punched in the cards 15 and 16, magnetic core storage devices represented by the numeral 20 generally are provided at each of these stations, one associated with a brush for each of the columns of data to be read from the card. Each of the devices 20, as shown, is of the ribbon core type and is provided with a write winding 22, a sense winding 24 and a sample winding 25. It is to be understood that cores of the NDRO (nondestructive readout) type could be used just as well.

The read or write windings 22 of the cores associated with the brushes P and PS are connected at one end to their respective brushes through resistors R1, and the other ends are connected together through diodes D and to ground through a capacitor 27 and a discharge resistor 28. The capacitor is of sufficient capacity to permit a charging current of such a value as to set one core if its winding is pulsed first, or to set both cores if their windings are pulsed at the same time, yet prevent setting of a second core after one core has been set. A reset relay R is provided, having a plurality of armatures and contacts such as *a* and *b* for respectively shunting the capacitors 27 of the different columns at the end of readout time so as to discharge them and re-enable them to limit current pulses from the brushes to a single cycle point during the next reading time, the relay R being, for example, normally energized through a circuit breaker CB1 which interrupts the energizing circuit of the relay R at the desired time. The contact rolls 11 and 12 are, as previously stated, connected by suitable contact brushes 14 to the positive terminal of a 48 volt source through means such as a circuit breaker CB2 which provides timed pulses at each of the card digit times. The sense windings 24 of the different core devices 20 for the primary brush station of the machine are connected in series and are connected to a terminal 32 for connection to a logic comparison circuit 34 which will be described in detail hereinafter. The sense windings 24 of all the magnetic core devices for the primary sequence brush station are likewise connected in series and connected to a terminal 36 for connection to the logic circuit 34. The sample windings 25 of the core devices 20 for each column of the primary and primary sequence stations are connected in series, and the series connected windings for each column are individually connected to a ring timing circuit 38 which, in conjunction with the timing circuit breaker CB3, provides timed pulses to the sample windings of each column in sequence, high order first, for reading out and resetting the cores at readout time.

The comparison circuit 34 may comprise a pair of pulse shaping circuits 40 of any suitable type fed from the sense windings 24, and whose outputs are applied to a diode switch or AND circuit 42, as well as to individual diode AND circuits 43 and 44 for indicating high primary and high primary sequence data, respectively. The output from the diode switching circuit 42 is also applied through inverters 45 and 46 to the AND circuits 43 and 44, respectively.

In operation, the cards 15 and 16 are advanced 9 edge first, moving from right to left. If, for example, a "9" digit is read by the primary brush P, a pulse will be supplied at "9" time to the write winding 22 of the left-hand core 20, charging the capacitor 27 and setting the core. Should a low order digit, such as a "5," be read by the primary sequence brush PS at a later digit 5 time, the brush PS will make contact with the contact roll 12 through the hole in the card 16 connecting the write winding 22 of the right-hand core to the source. However, since the capacitor 27 has previously been charged by the pulse to the write winding 22 of the left-hand core, the reading of a "5" at a later time in the same card time cannot cause a pulse of current to pass through the winding 22 of the right-hand core. Accordingly, the right-hand core is not set.

When all of the digits in each of the columns have been read, the circuit breaker CB3 closes to energize the timing ring 38 and successively pulse the sample windings 25 of the primary and primary sequence core devices, column by column in sequence. Since in the particular example chosen the left-hand core associated with the primary brush P was set by a pulse read at "9" time, energization of the sample windings 25 resets the left-hand core and produces an output pulse in the sense winding 24. Since the right-hand core was not set, energization of its sample winding 25 does nothing to the core, which remained reset. Accordingly, an output pulse is applied to the terminal 32 and thence through the pulse shaper 40 to the AND circuits 42 and 43. No output pulse appears at the terminal 36. Accordingly, coincidence does not occur at the AND circuit 42, so that the output of the AND circuit 42 remains down, and the inverter 45 applies an output signal to the AND circuit 43 which coincides with the pulse from the pulse shaper 40. Accordingly, a high primary sequence output appears at the terminal 49. While the inverter 46 likewise applies a signal to the AND circuit 44, no output signal is produced at the terminal 36, and hence the AND circuit 44 output remains down.

Should the primary and primary sequence brushes P and PS read digits simultaneously, digit pulses will be applied to the write windings 22 of both core devices simultaneously, charging the capacitor 27 and setting both of the cores. When the cores are sampled at readout time by the energization of their sample windings 25, both cores having been set will be reset, and both cores will provide output pulses at their sense windings 24. The terminals 32 and 36 each apply pulses to their pulse shapers 40, so that coincidence occurs at the AND circuit 42, thus providing an equal output signal at the terminal 50. The output signals are at the same time applied to the AND circuits 43 and 44 from the pulse shapers 40, but since the output of the AND circuit 42 is up, the inverters 45 and 46 do not apply output signals to the AND circuits 43 and 44. Hence, no coincidence occurs at the AND circuits 43 and 44, and the output terminals 49 and 51 of the comparison circuit 34 will remain down.

In a typical case, the blocking capacitor 27 has a value of .25 mfd., resistors R1 are 390 ohms and resistor 28 is 220 ohms, for a 1 millisecond pulse from a 48 volt brush pulse source, using NDRO cores having a cross section approximately .2 x .04 square inch. With a ribbon core having a cross section of approximately .125 x .032 square inch, capacitor 27 has a value of .1 mfd., while the resistors have approximately the same values as for the NDRO core. The ribbon core was made from 32 wraps of 1 mil thick ribbon, .125 inch wide, and had an over-all diameter on the order of .5 inch.

Referring to FIG. 2 of the drawings, there is shown a sequence checking circuit utilizing a plurality of magnetic core storage devices 55 of the NDRO (nondestructive readout) type, each having a write winding 56, a sense or readout and reset winding 57 and a sample winding 58 arranged on a magnetic core 59. The windings 56 and 57 completely encircle the core, while the sample winding 58 is of the figure 8 type and arranged about the core 59 in conjunction with an opening 60 therein. If the core is set in one sense, as by pulsing the write winding 56, it may be repetitively sampled by pulsing the sample winding 58, until reset by pulsing the sense winding to reverse or reset the flux in the core. The write windings 56 are connected at one end to hubs PH and PSH which may be connected to the primary and primary sequence brushes in the manner shown in FIG. 1 of the drawings. The other ends of the write windings 56 are connected to ground through individual resistors *r* and a common cathode resistor R2. The sense windings 58 are connected at one end to ground and at the other end are connected through normally open points *c*, *d*, *e* and *f* of relay RR to a comparison circuit 62 by means of conductors 63 and 64, respectively. The sense windings are also connected through the normally closed points of relay RR and diodes D and coupling capacitors C to the control grids *g* of a thyratron type blocking tube 65, having its plate *p* connected to a source of positive voltage and the cathode 61 connected to ground through the common resistor R2. A circuit breaker CB4 is provided for normally connecting the sample windings 58 of the two core devices for each column to apply thereto a pulse mid-way between the card digit pulses. This pulse follows each digit time and operates to provide a positive output from the sense winding 58 of the core which may have been set by the sensing of a digit, so as to fire the thyratron 65 and thus produce a sufficient voltage drop across the resistor R2 to prevent the reading of a digit by the other brush from setting the other core at a later digit time. The readout relay RR is provided for transferring the connections of the sample windings 58 from the circuit breaker CB4 to a suitable ring timing circuit 38 for energizing the sample windings in sequence column by column, high order first, at the end of the card reading time and also to isolate each column sense winding from common conductor 63 and 64 at all times, except during timing ring operation.

The compare circuit 62 comprises a latch tube 66 of the thyratron type disposed to be triggered by an output pulse from the primary sense windings and a latch tube 67 disposed to be triggered by an output from the primary sequence sense windings. An inverter 68 associated with the latch tube 66 holds down the screen grid of the latch tube 67 when the latch tube 66 is being fired, and an associated inverter 69 likewise holds down the screen grid of latch tube 66 to prevent it from firing when the latch tube 67 is being fired. Tubes 68 and 69 operate faster than 66 and 67 and are the means of preventing either 66 or 67 from operating on an equal condition.

Means, such as the primary and primary sequence relays PR and PSR may be connected in the plate circuits of the latch tubes 66 and 67, respectively, through a circuit breaker CB5 for rendering the tubes energizable in response to pulses received from the sense windings 57 during readout time, to selectively effect energization of the relays.

In operation, pulses will be applied to the brush hubs PH or PSH in accordance with the data on the cards in their respective brush stations in the manner described in connection with the system shown in FIG. 1. Should a "9," for example, be read by the primary brush P, a pulse will be applied to the write winding 56 of the left-hand core at "9" time, and immediately following the brush pulse time, a pulse will be applied to the sample winding 58 through the circuit breaker CB4 which closes at mid-card pulse time following each card digit time. Accordingly, an output pulse appears at the sense winding 57 which is applied to the control grid of the blocking tube 65, causing it to be fired. This produces a voltage drop across the cathode resistor R2, which raises the potential of the write winding 56 of the right-hand core sufficiently high so that a pulse applied to the brush hub PSH at a later digit time cannot set its core.

At the end of the card reading time, the read-out relay RR is energized by timing means, such as circuit breaker CB5 or the like, and transfers its armatures *a*, *b*, etc., to connect the sample windings 58 for energization in sequence, column by column from a column timing ring 38 similar to that shown in connection with the circuit of FIG. 1 and also to connect the sense windings 57 to the compare circuit 62. When the sample winding 58 of the primary magnetic core storage device is energized, an output appears at its sense winding 57 which is applied through armature *c* and conductor 63 to the control grid of the latch tube 66 and to the control grid of the inverter 58. The latch tube 66 and inverter 68 are rendered conductive. The latch tube 66 effects operation of the primary relay PR to indicate a high primary sequence, while the inverter 68 remains fired for the duration of the sample pulse and drops the screen grid of the latch tube 67 to prevent firing of this tube. The voltage drop across common cathode resistor R3 prevents the tube 67 from being fired by a high primary sequence from a lower order column storage core at a later column time.

In the event that similar digits are sensed at the primary and primary sequence hubs, pulses will be applied to the write windings 56 of both cores and both cores will be set before the blocking tube 65 can be effective. When the sample windings 58 of both cores are energized at mid-cycle pulse time through the circuit breaker CB4, the tube 65 will first but will be ineffective, since both cores are already set. When the sample windings 58 are energized at readout time from the timing ring 38, pulses will be applied to the control grids of the latch tubes 66 and 67 simultaneously and to the control grids of inverters 68 and 69. Due to the relative speeds of the latch tubes and inverters, the latch tubes will not be fired. The decision therefore is not determined on this particular column. Reset of the cores may be effected by reverse energization of the write windings 56 or sense windings 57 at the end of the readout or compare time.

Referring to FIG. 3, it will be seen that primary and primary sequence brushes P and PS, reading cards 15 and 16, respectively, may be connected in opposite senses to the write winding 56 of an NDRO core device 55 for effecting saturation thereof in opposite senses. The sample windings 58 of the different core devices for the different columns are connected in series (for a given column) to a ring timing circuit 38, which is energized through a circuit breaker CB3 at readout time for effecting the production of output pulses at the sense windings 57 of the particular column which may have been set. The sense windings 57 are connected in series and are connected through a circuit breaker CB5, which closes at readout time, to latches 70 and 72, through diodes D1 and D2 which are arranged in conjunction with inverters 73 and 74 so that the latch 70 is responsive to negative pulses and the latch 72 is responsive to positive pulses. The latches 70 and 72 are interlocked by means of conductors 75 and 76 so that whichever latch fires or is triggered first, prevents the other one from being triggered. The latches 70 and 72 are arranged to energize high primary sequence and high primary relays HPS and HP, respectively.

In operation, the circuit breaker CB2 closes each digit time to provide a digit pulse, and should the primary card 15, for example, have a "9" thereon in column 1, while the primary sequence card 16 has an "8" thereon, the core 59 will be set positively by the "9" pulse at "9" time, and later will be set to the opposite polarity by a pulse at "8" time from the primary sequence brush PS. When the core 59 is sampled at readout time for column 1, by a pulse from the timing ring 38, the second or later digit read from a primary sequence brush will be controlling, and a negative going pulse will be produced at the sense winding 57. This pulse is applied through the circuit breaker CB5, which closes at readout time, to the inverter 74 through the diode D2 to effect operation of the latch 72. Latch 72 in turn effects operation of the high primary relay HP to indicate a high primary reading. At the same time, an output is provided over the conductor 76 to prevent operation of the latch 70.

Should the primary brush P and the primary sequence brush PS read similar digits, an attempt will be made to energize the write winding 56 simultaneously in opposite directions, resulting in no energization. The core 59 remains de-energized. When the sample winding 58 is pulsed from the timing ring 38 at readout time, neither latch is operated, and contacts of the relays HP and HPS may be utilized in a well-known manner to indicate an equal condition. A core restorer 78 is provided for applying damped oscillations to the cores through the sense windings 57 after readout time, in order to reset the core to a zero magnetic condition. This is done by running the core through successively decreasing hysteresis loops to arrive at a final magnetic null point.

From the above description and the accompanying drawings, it will be apparent that this invention provides in a simple and inexpensive manner for readily determining the sequence of digit data stored in the punched card or the like by using magnetic core of either the ribbon type as shown in FIG. 1 or the NDRO type as shown in FIGS. 2 and 3, a compact and inexpensive sequence arrangement may be provided which is inexpensive to manufacture and is extremely reliable in operation.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. The combination in a record element controlled machine having a pair of sensing means for simultaneously sensing one or more columns of data on each of a pair of record data bearing elements digit value by digit value in sequence, of magnetic core data storage means, circuit means connecting the storage means and sensing means and including blocking means activated by sensing data from one element at a first digit time for selectively storing sensed data of a predetermined relative value from only said one element as between said value and a different value sensed at a later digit time from the other element for corresponding columns of the two elements, and means for sampling the magnetic core storage means column by column to determine the sequence of data on the elements.

2. The combination in a record card controlled machine having a pair of sensing devices for simultaneously sensing corresponding columns of a pair of record data bearing cards digit value by digit value in sequence, of magnetic core means having read, sense and sample windings, circuit means including blocking means activated by sensing a data signal of a predetermined value in one card at one time connecting the sensing devices to the read winding to selectively store a data signal from said one card in accordance with a particular digit value order of reading and prevent storing a data signal from the other card at a different digit time, output means connected to the sense winding for selectively determining the characters of an output signal in accordance with the stored data signal, and timing means for effecting energization of the sample winding to produce an output signal in the sense windings.

3. In a record card controlled machine having a pair of sensing brushes for simultaneously sensing digit data values in corresponding columns of a pair of cards in a predetermined digit sequence, means for applying timed digit pulses to the brushes as the different values are sensed, a pair of magnetic core storage devices having a plurality of windings thereon, data compare means, means including a common capacitor connecting one winding of each device to one of the brushes for storing only the highest value order digit data read from either card, circuit means connecting another winding of each device to the compare means for producing comparison output signals, and means including a timing circuit for sequentially effecting energization of another winding of each device to effect operation of the compare means from said another windings.

4. In a record card machine having a pair of sensing brushes for simultaneously sensing in sequence different digit values in corresponding columns of a pair of cards, a pair of magnetic core storage devices having write, sense and sample windings, circuit means including a capacitor connecting the write windings to said brushes to prevent energization of one of the write windings after the other, compare means connected in circuit with the sense windings, and means connecting the sample windings to a source of electrical energy to effect selective operation of the compare means from the sense windings.

5. In a record card controlled machine, having a pair of card sensing means for sequentially sensing different digit value orders of data in corresponding columns of the cards in a given cycle of operation, a pair of magnetic core data storage means each having input, output and sample windings, means including a common capacitor connecting the input windings of the storage means to respective sensing means so as to prevent magnetization of one core at a later digit time than the other, compare means, circuit means connecting the compare means to the output windings, means including a timing ring for effecting energization of the sample windings at a predetermined time, and reset means operable to discharge the capacitor before the sensing means enters another operating cycle.

6. In a record card machine having a pair of sensing stations each with a plurality of brushes for simultaneously sensing corresponding columns of a pair of cards digit value by digit value in a predetermined sequence, a pair of magnetic core data storage devices one for each of said columns having read, sense and sample windings, means including a capacitor common to the read windings of each of said columns connecting said windings of the pair of devices in circuit with their respective brushes for permitting a single pulse of charging current to flow which is sufficient to set either or both devices at one time, compare means, circuit means connecting the sense windings of the storage devices of each column at one station in one series circuit to the compare means and the sense windings of the other devices of each column at the other station in another series circuit, timing means sequentially connecting the sample windings of the different columns to a source of electrical energy in sequence, and reset means for discharging each capacitor after the sample windings are energized.

7. In a record card reading machine, a pair of sensing stations each having a plurality of brushes for simultaneously sensing one column each of a plurality of columns of digit data on the cards in a predetermined digit value sequence, a single magnetic core storage device for each pair of corresponding column brushes of said stations having read, sense and sample windings; circuit means connecting the brushes of the stations to the read winding to effect energization thereof in opposite senses in accordance with digit data on the cards to store only the later read or the lower order digit data, compare means including a pair of output devices so interlocked that operation of one in response to a low order digit data prevents subsequent operation of the other, oppositely disposed unidirectional means connecting the output devices in circuit with the sense windings, and means sequentially connecting the sample windings of the storage devices to a source of electrical energy for effecting energization of the sense windings in accordance with the stored digit data.

8. In combination with a record card controlled machine having a pair of data reading stations with at least one brush at each station for simultaneously sensing corresponding data digit on values for corresponding columns of each of the cards in a predetermined digit sequence in a card cycle, magnetic core data storage means associated with each of said brushes having read, sense and sample windings, circuit means connecting the read windings to their respective brushes, pulse means for applying timed digit pulses to the brushes, blocking means connected to the sense windings to prevent energization of one of the read windings at a later digit time than the other, compare means connected to the sense windings to determine the high order data, means for energizing the sample windings between each digit time to effect operation of the blocking means, and means operative at the end of card cycle to effect operation of the compare means from one or the other of the sense windings.

References Cited in the file of this patent

UNITED STATES PATENTS 2,920,310 Sallach ---------------- Jan. 5, 1960